(12) United States Patent
Pajdak

(10) Patent No.: US 10,556,530 B2
(45) Date of Patent: Feb. 11, 2020

(54) COMPONENT FOR A VEHICLE SEAT

(71) Applicant: Faurecia Automotive Seating, LLC, Auburn Hills, MI (US)

(72) Inventor: Marcin Pajdak, Wałbrzych (PL)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/021,126

(22) Filed: Jun. 28, 2018

(65) Prior Publication Data
US 2020/0001759 A1 Jan. 2, 2020

(51) Int. Cl.
| | |
|---|---|
| *B60N 2/80* | (2018.01) |
| *B60N 2/70* | (2006.01) |
| *B68G 7/05* | (2006.01) |
| *B68G 11/04* | (2006.01) |
| *B29C 44/58* | (2006.01) |
| *B29C 44/18* | (2006.01) |
| *B29K 105/04* | (2006.01) |
| *B29L 31/30* | (2006.01) |
| *B29L 31/00* | (2006.01) |

(52) U.S. Cl.
CPC .......... *B60N 2/7017* (2013.01); *B29C 44/181* (2013.01); *B29C 44/58* (2013.01); *B68G 7/05* (2013.01); *B68G 11/04* (2013.01); *B29K 2105/04* (2013.01); *B29L 2031/3023* (2013.01); *B29L 2031/771* (2013.01)

(58) Field of Classification Search
CPC .................................................... B60N 2/7017
USPC ........................ 297/220, 391, 452.58, 452.61
See application file for complete search history.

(56) References Cited

U.S. PATENT DOCUMENTS

| | | | | |
|---|---|---|---|---|
| 4,003,599 A | * | 1/1977 | Takamatsu ............. | A47C 7/386 297/391 X |
| 4,848,836 A | * | 7/1989 | Masui ...................... | B60N 2/80 297/220 |
| 4,858,994 A | * | 8/1989 | Yamashita ............. | B60N 2/838 297/391 |
| 5,316,372 A | * | 5/1994 | Amner ................ | B29C 44/1233 297/391 X |
| 5,326,151 A | * | 7/1994 | Smith .................. | B60N 2/5883 297/220 X |
| 5,452,939 A | * | 9/1995 | Kupisz .................... | B29C 33/12 297/391 X |
| 5,478,136 A | * | 12/1995 | Takeuchi ................ | B29C 33/12 297/391 |

(Continued)

FOREIGN PATENT DOCUMENTS

| | | |
|---|---|---|
| CN | 201128234 | 10/2008 |
| EP | 0734831 | 10/1996 |

(Continued)

OTHER PUBLICATIONS

Faurecia, Auto Shanghai 2013 Press Kit, Hall N5, Booth B013, Apr. 20-29, 2013, 21 pages.

*Primary Examiner* — Rodney B White
(74) *Attorney, Agent, or Firm* — Barnes & Thornburg LLP

(57) ABSTRACT

A component of a vehicle seat and method for the production thereof includes a cover having a plurality of panels with each panel including a peripheral mating surface. The plurality of panels are mated together at the peripheral mating surfaces to form a cavity and foam is injected into the cavity of the cover.

8 Claims, 2 Drawing Sheets

(56) References Cited

U.S. PATENT DOCUMENTS

| | | | | |
|---|---|---|---|---|
| 5,820,222 | A * | 10/1998 | De Filippo | B60N 2/80 297/452.58 |
| 5,896,823 | A * | 4/1999 | Ishikawa | B29C 67/0018 297/220 X |
| 6,068,338 | A * | 5/2000 | Takei | B60N 2/809 297/391 |
| 6,120,100 | A * | 9/2000 | Palazzolo | B29C 44/12 297/391 |
| 6,149,233 | A * | 11/2000 | Takei | B60N 2/70 297/391 X |
| 6,857,699 | B2 * | 2/2005 | Ashton | B60N 2/5825 297/220 |
| 7,222,401 | B2 * | 5/2007 | Ashton | B60N 2/5825 297/391 X |
| 7,585,025 | B2 * | 9/2009 | Welch | B60N 2/809 297/220 X |
| 7,819,480 | B2 * | 10/2010 | Asbury | A47C 7/38 297/391 |
| 8,469,393 | B1 | 6/2013 | Siewert | |
| 8,870,219 | B1 | 10/2014 | Roy | |
| 9,039,036 | B1 | 5/2015 | Roy | |
| 9,539,923 | B2 * | 1/2017 | Ishimoto | B60N 2/80 |
| 2003/0098113 | A1 * | 5/2003 | Takei | B29C 44/143 156/79 |
| 2007/0188004 | A1 * | 8/2007 | Browne | B60N 2/888 297/391 |
| 2008/0265645 | A1 * | 10/2008 | Kasuya | B60N 2/888 297/391 |
| 2015/0251576 | A1 * | 9/2015 | Ishimoto | B60N 2/80 297/391 |
| 2016/0167551 | A1 * | 6/2016 | Okamoto | B60N 2/80 297/391 |

FOREIGN PATENT DOCUMENTS

| | | |
|---|---|---|
| EP | 0825654 | 2/1998 |
| EP | 0995568 | 4/2000 |
| JP | H05131545 | 5/1993 |
| JP | H10857955 | 3/1996 |
| JP | H10128842 | 5/1998 |
| JP | 2002347116 | 12/2002 |
| JP | 2008149656 | 7/2008 |
| WO | 2009078476 | 6/2009 |

* cited by examiner

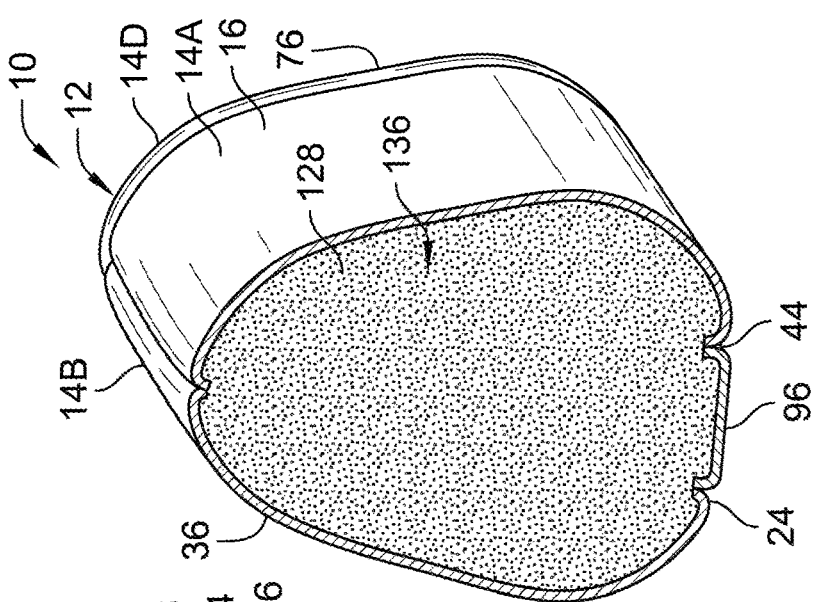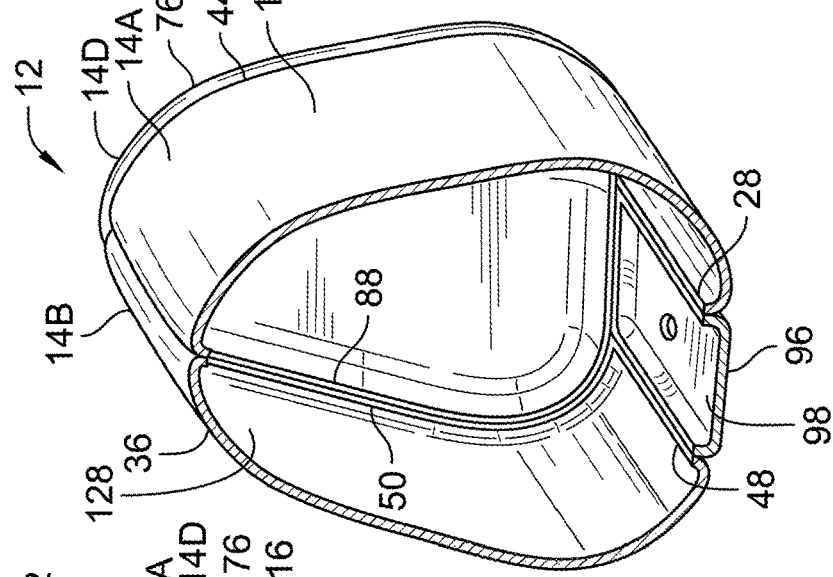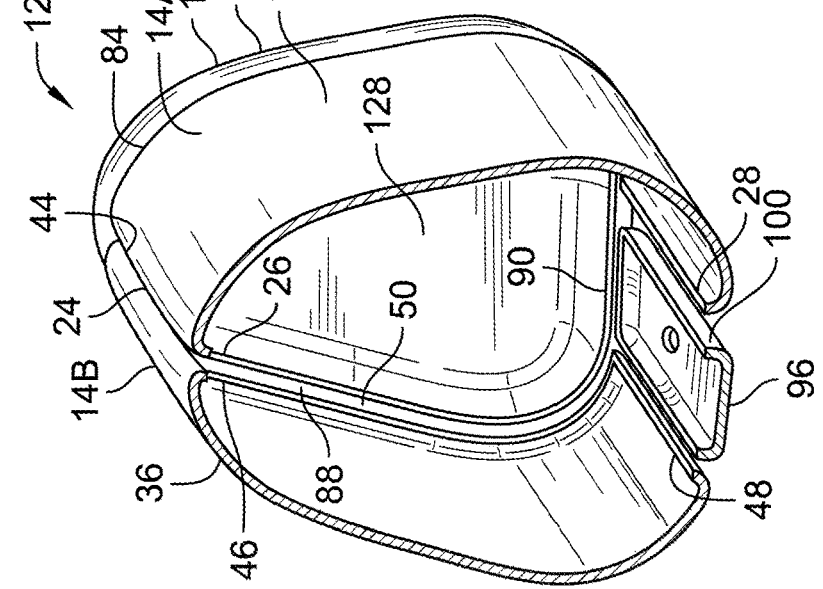

US 10,556,530 B2

COMPONENT FOR A VEHICLE SEAT

BACKGROUND

The present disclosure relates to a component for a vehicle, and particularly to a component for a vehicle seat. More particularly, the present disclosure relates to a component for a vehicle seat made using a a foaming process.

SUMMARY

According to the present disclosure, a component of a vehicle seat and method for the production thereof includes a cover having a plurality of panels with each panel including a peripheral mating surface. The mating surface of each panel is adapted to matingly engage the mating surface of an adjacent panel to form a cavity within the cover.

In illustrative embodiments, the panels of the cover are located in the chamber of a compression mold and the exterior surfaces of the panels are in engagement with interior surfaces of the walls of the mold. The walls of the mold include vacuum apertures and vacuum conduits connected to a vacuum system such that the exterior surfaces of the panels are secured to the interior surfaces of the mold walls by suction forces.

In illustrative embodiments, the compression mold presses the panels of the cover together such that the mating surface of each panel is in mating engagement with a mating surface of an adjacent panel. Subsequently, a foam is injected into the interior cavity of the cover. The foam adheres to the interior surfaces of the panels and secures the panels together with the mating surfaces of the panels in mating engagement with the mating surface of adjacent panels.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 3 is a cross sectional view of the cover of the component for a vehicle seat prior to compression within the compression mold;

FIG. 4 is a cross sectional view of the cover of the component for a vehicle seat shown when the cover is compressed within the compression mold; and FIG. 5 is a cross sectional view of the cover of the component of the vehicle seat after the cover has been compressed within the compression mold and foam has been injected into an interior cavity of the cover with the foam securing the panels and mounting bracket of the cover in engagement with one another.

DETAILED DESCRIPTION

Figure 1:
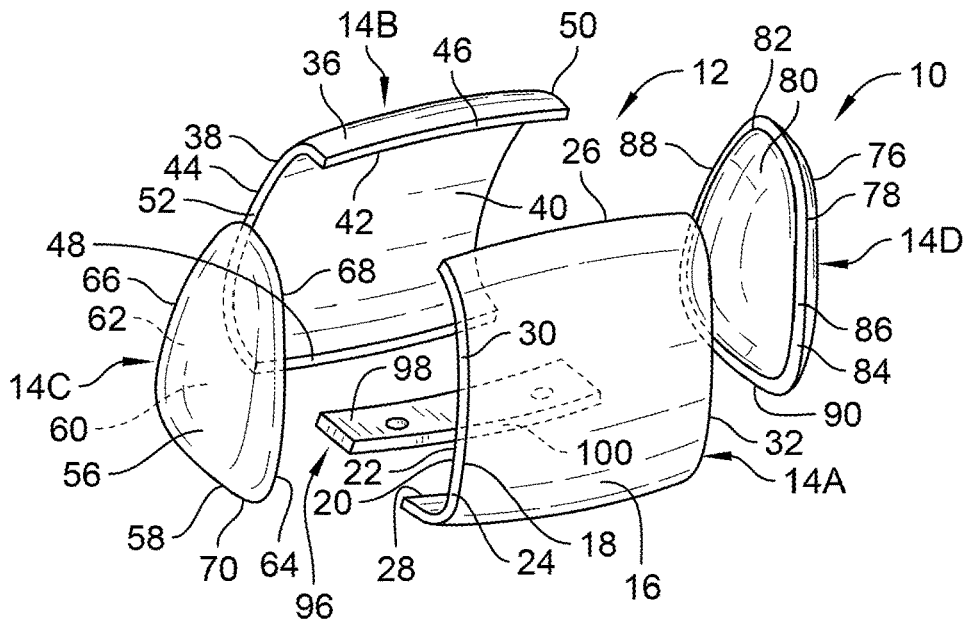
FIG. 1 is an exploded view of the cover of a component for a vehicle seat.

A component 10 for a vehicle seat of a vehicle includes a cover 12 as shown in FIG. 1. Component 10 may be, for example, a headrest, backrest, seat bottom, or any other suitable component of a vehicle seat. Cover 12 includes a plurality of panels 14. In the illustrative embodiment as shown in FIG. 1, cover 12 includes a front panel 14A, a rear panel 14B, a left panel 14C, and a right panel 14D.

Front panel 14A includes an exterior surface 16 having a peripheral edge 18, an interior surface 20 having a peripheral edge 22, and a peripheral mating surface 24 that extends between the peripheral edge 18 of the exterior surface 16 and the peripheral edge 22 of the interior surface 20. Mating surface 24 includes an exterior peripheral edge that is coextensive with the peripheral edge 18 of the exterior surface 16 and an interior peripheral edge that is coextensive with the peripheral edge 22 of interior surface 20. Mating surface 24 includes a top mating surface portion 26 and a spaced apart bottom mating surface portion 28. Mating surface 24 also includes a left side mating surface portion 30 and a spaced apart right side mating surface portion 32. Left side mating surface portion 30 and right side mating surface portion 32 extend between top mating surface portion 26 and bottom mating surface portion 28.

Rear panel 14B includes an exterior surface 36 having a peripheral edge 38, an interior surface 40 having a peripheral edge 42, and a peripheral mating surface 44 that extends between the peripheral edge 38 of the exterior surface 36 and the peripheral edge 42 of the interior surface 40. Mating surface 44 includes an exterior peripheral edge that is coextensive with the peripheral edge 38 of the exterior surface 36 and an interior peripheral edge that is coextensive with the peripheral edge 42 of interior surface 40. Mating surface 44 includes a top mating surface portion 46 and a spaced apart bottom mating surface portion 48. Mating surface 44 also includes a left side mating surface portion 50 and a spaced apart right side mating surface portion 52. Left side mating surface portion 50 and right side mating surface portion 52 extend between top mating surface portion 46 and bottom mating surface portion 48.

Left panel 14C includes an exterior surface 56 having a peripheral edge 58, an interior surface 60 having a peripheral edge 62, and a peripheral mating surface 64 that extends between the peripheral edge 58 of the exterior surface 56 and the peripheral edge 62 of the interior surface 60. Mating surface 64 includes an exterior peripheral edge that is coextensive with the peripheral edge 58 of the exterior surface 56 and an interior peripheral edge that is coextensive with the peripheral edge 62 of interior surface 60. Mating surface 64 includes a left side mating surface portion 66, a right side mating surface portion 68, and a bottom mating surface portion 70.

Right panel 14D includes an exterior surface 76 having a peripheral edge 78, an interior surface 80 having a peripheral edge 82, and a peripheral mating surface 84 that extends between the peripheral edge 78 of the exterior surface 76 and the peripheral edge 82 of the interior surface 80. Mating surface 84 includes an exterior peripheral edge that is coextensive with the peripheral edge 78 of the exterior surface 76 and an interior peripheral edge that is coextensive with the peripheral edge 82 of interior surface 80. Mating surface 84 includes a left side mating surface portion 86, a right side mating surface portion 88, and a bottom mating surface portion 90.

Each panel 14A-D may comprise a pre-formed foam-in-place laminated panel having an exterior skin, an internal substrate, and a foam layer located between the skin and the substrate. The skin of each panel 14A-D includes the external surface and the peripheral mating surface of the panel, and the substrate of each panel 14A-D includes the internal surface of the panel 14A-D. Front panel 14A and rear panel 14B may be formed in the same configuration as one another or as a mirror image of one another. Left panel 14C and right panel 14D may be formed substantially identical to one another or as mirror images of one another. Panels 14A-D may be formed in various configurations as desired with the exterior surfaces and peripheral edges of the exterior surfaces of the panels 14A-D having various configurations and contours as desired.

Cover 12 may include a mounting member 96, such as a bracket, as shown in FIG. 1. Mounting member 96 includes a base 98 having an external surface, an internal surface, and a peripheral mating surface 100. Base 98 may include one or more apertures.

Figure 2:
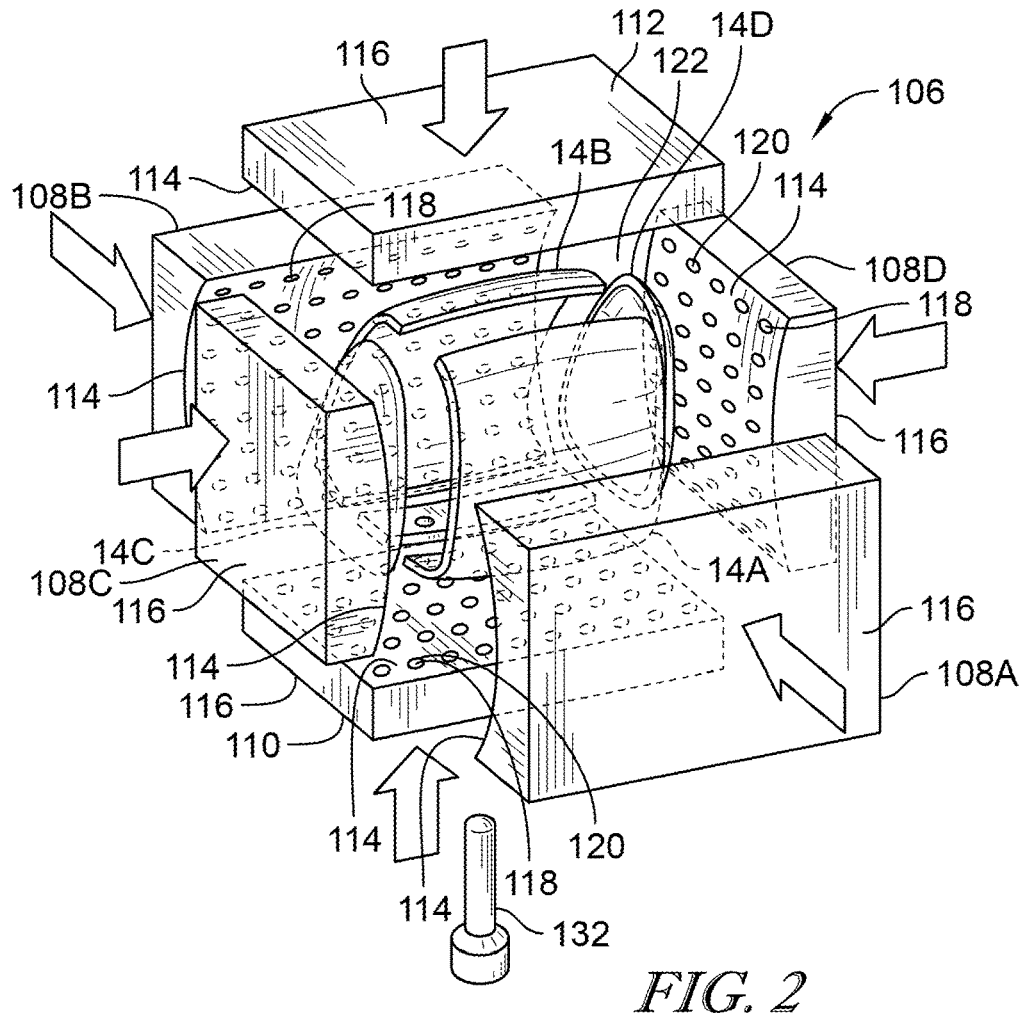
FIG. 2 is an illustrative view showing the component parts of the cover of the vehicle seat located within a compression mold.

An illustrative example of a compression mold 106 for producing the component 10 is shown in FIG. 2. Compression mold 106 includes a front side wall 108A, an opposing and spaced apart rear side wall 108B, a left side wall 108C and a right side wall 108D that is spaced apart from and opposing left side wall 108C. Compression mold 106 also includes a bottom wall 110 and a top wall 112. Each side wall 108A-D, bottom wall 110 and top wall 112 includes an interior securement surface 114 and an exterior surface 116. Interior surfaces 114 of side walls 108A-D, bottom wall 110 and top wall 112 of mold 106 are respectively shaped to conform to the desired final external configuration of cover 12. Interior surface 114 of each side wall 108A-D, bottom wall 110 and top wall 112 includes a plurality of vacuum apertures 118. Each vacuum aperture 118 is in fluid communication with a vacuum conduit 120. Vacuum apertures 118 and vacuum conduits 120 of each side wall 108A-D, bottom wall 110 and top wall 112 are in fluid communication with a vacuum system that is adapted to withdraw air from the vacuum apertures 118 and vacuum conduits 120 to create a vacuum, such as a low-pressure area, or suction force therein. Compression mold 106 includes an interior chamber 122 formed between side walls 108A-D, bottom wall 110 and top wall 112.

Each of the panels 14A-D of cover 12 are separately placed within interior chamber 122 of mold 106. Mounting member 96 of cover 12 is also placed within interior chamber 122 of mold 106. Each panel 14A-D is placed in engagement with a respective side wall 108A-D of mold 106 such that the interior surface of each panel 14A-D is in conforming engagement with the interior surface 114 of its respective side wall 108A-D of mold 106. The top ends of panels 14A-D are placed in conforming engagement with the interior surface 114 of top wall 112 of mold 106. The exterior surface of mounting member 96 is placed in conforming engagement with the interior surface 114 of bottom wall 110 of mold 106.

Front panel 14A is placed in mold 106 with exterior surface 16 of front panel 14A in mating engagement with interior surface 114 of side wall 108A of mold 106. Exterior surface 16 of front panel 14A is releasably secured to and in mating engagement and conformance with interior surface 114 of first side wall 108A by the vacuum or suction force formed within vacuum apertures 118 and vacuum conduits 120 by the vacuum system. Exterior surface 36 of rear panel 14B is similarly releasably secured to and in mating engagement and conformance with interior surface 114 of rear side wall 108B of mold 106 by the vacuum or suction force formed in vacuum apertures 118 and vacuum conduits 120 of rear side wall 108B of mold 106 by the vacuum system.

Exterior surface 56 of left panel 14C is similarly releasably secured to and in mating engagement and conformance with interior surface 114 of left side wall 108C of mold 106 by the vacuum or suction force formed in vacuum apertures 118 and vacuum conduits 120 of left side wall 108C by the vacuum system. Exterior surface 76 of right panel 14D is similarly releasably secured to and in mating engagement and conformance with interior surface 114 of right side wall 108D of mold 106 by the vacuum or suction force created within vacuum apertures 118 and vacuum conduits 120 of right side wall 108D by the vacuum system.

Top portions of the panels 14A-D are adapted to be releasably secured to and in mating engagement and conformance with interior surface 114 of top wall 112 of mold 106 by the vacuum or suction force created within vacuum apertures 118 and vacuum conduits 120 of top wall 112 by the vacuum system. Mounting member 96 and the bottom ends of panels 14A-D are releasably secured to and in mating engagement and conformance with interior surface 114 of bottom wall 110 of mold 106 by the vacuum or suction force created within vacuum apertures 118 and vacuum conduits 120 of bottom wall 110 by the vacuum system. FIG. 3 illustrates a cross section of cover 12 when panels 14A-D and mounting member 96 are located within interior chamber 122 of mold 106 prior to compression by mold 106.

After panels 14A-D and mounting member 96 are located within interior chamber 122 of mold 106, and are secured to the side walls 108A-D, bottom wall 110 and top wall 112 of mold 106 by the vacuum system, the side walls 108A-D, bottom wall 110 and top wall 112 of mold 106 apply compressive forces, as illustrated by the arrows in FIG. 2, to panels 14A-D and mounting member 96, such that panels 14A-D and mounting member 96 are compressed together as generally shown in the cross section of cover 12 in FIG. 4.

When panels 14A-D and mounting member 96 of cover 12 are compressed together by mold 106, top mating surface portion 26 of mating surface 24 of front panel 14A is in mating engagement with top mating surface portion 46 of mating surface 44 of rear panel 14B, bottom mating surface portion 28 of mating surface 24 of front panel 14A is in mating engagement with peripheral mating surface 100 of mounting member 96, and bottom mating surface portion 48 of mating surface 44 of rear panel 14B is in mating engagement with peripheral mating surface 100 of mounting member 96. Left side mating surface portion 66 of mating surface 64 of left panel 14C is in mating engagement with right side mounting surface portion 52 of mating surface 44 of rear panel 14B, right side mating surface portion 68 of mounting surface 64 of left panel 14B is in mating engagement with left side mounting surface portion 30 of mating surface 24 of front panel 14A, and bottom mating surface 70 of mating surface 64 of left panel 14C is in engagement with peripheral mounting surface 100 of mounting member 96. Left side mounting surface portion 86 of mating surface 84 of right panel 14D is in mating engagement with right side mating surface portion 32 of mating surface 24 of front panel 14A, right side mating surface portion 88 of mating surface 84 of right panel 14D is in mating engagement with left side mating surface portion 50 of mating surface 44 of rear panel 14B, and bottom mating surface portion 90 of mating surface 84 of right panel 14D is in mating engagement with peripheral mounting surface 100 of mounting member 96. Panels 14A-D and mounting member 96 form an interior cavity 128 of cover 12.

The mating surfaces of each panel 14A-D and mounting member 96 are disposed at an angle relative to the exterior surface of the panels 14A-D and mounting member 96 such that when the panels 14A-D and mounting member 96 are pressed together by mold 106, the mating surfaces of each panel 14A-D matingly engage with the mating surface of the adjacent panel and with the mating surface of mounting member 96, from the internal edges of the mating surfaces to the external edges of the mating surfaces and along their perimeter. The mating surfaces of panels 14A-D and mounting member 96 are compressed together in mating engagement by mold 106 to form a seal therebetween. If desired, a seal member, such as a gasket, can be placed between adjacent mating surfaces of panels 14A-D and mounting member 96 to further create a seal therebetween. As used herein the mating surfaces of the panels 14A-D and mounting member 96 are in mating engagement with one another although there may be a sealant member, such as a gasket or adhesive, located between adjacent mating surfaces.

After the panels 14A-D and mounting member 96 have been compressed into engagement with one another by mold 106 as shown in FIG. 4, the tip of a foam injection funnel 132 is placed within the hollow interior cavity 128 of cover 12 and foam is injected into interior cavity 128 to create a foam core 136 within cover 12. The foam of foam core 136 adheres to the interior surfaces of panels 14A-D and mounting member 96, and secures panels 14A-D and mounting member 96 to one another, with the mating surfaces of panels 14A-D and mounting member 96 secured in mating engagement with one another. The foam of foam core 136 secures panels 14A-D and mounting member 96 of cover 12 together without the use of sewing or any thread.

After foam has been injected into interior cavity 128 of cover 12 and the foam has cured or set, the vacuum system releases the vacuum or negative air pressure within vacuum apertures 118 and vacuum conduits 120 of mold 106 to release panels 14A-D and mounting member 96 from side walls 108A-D, bottom wall 110 and top wall 112 of mold 106, and funnel 132 is withdrawn from the interior cavity 128. The component 10, including the cover 12 and foam core 136, is then removed from the interior chamber 122 of mold 106. A cross section of an illustrative embodiment of component 10, including cover 12 and foam core 136, is shown in FIG. 5.

If desired, a layer of adhesive material can be applied to one or more mating surfaces of panels 14A-D and mounting member 96 prior to compression within mold 106 to provide for additional securement of the panels 14A-D and mounting member 96 in mating engagement with one another, in addition to the securement provided by the foam core 136. Cover 12 of component 10 includes uniformly linear lines, or uniformly curved lines, as desired between adjacent panels 14A-D.

Prior components for vehicle seats required that the parts of the component be sewn together, which is an expensive, time consuming and difficult manual process, requiring very skilled operators. In addition, it is difficult to obtain straight sewing lines between the individual parts of the prior components of a vehicle seat. In the illustrative embodiments, the present disclosure provides a component for a vehicle seat without any sewing of the panels 14A-D to one another, and the finished component 10 includes a cover 12 having uniformly straight and curved lines as desired.

The following numbered clauses include embodiments that are contemplated and non-limiting:

Clause 1. A component for a vehicle, the component comprising a cover including a plurality of panels, each panel including an exterior surface, an interior surface, and a peripheral mating surface extending between the exterior surface and the interior surface.

Clause 2. The component of clause 1, any other clause, or any combination of clauses, wherein the mating surface of each panel being in mating engagement with the mating surface of one or more adjacently located panels, the plurality of panels forming an interior cavity in the cover.

Clause 3. The component of clause 2, any other clause, or any combination of clauses, further comprising a foam core located in the interior cavity of the cover.

Clause 4. The component of clause 3, any other clause, or any combination of clauses, wherein the foam core is connected to the interior surface of each of the panels and secures the panels together with the mating surface of each panel being in engagement with the mating surface of one or more adjacent panels.

Clause 5. The component of clause 4, any other clause, or any combination of clauses, wherein each panel comprises an exterior skin, an internal substrate, and a foam layer located between the skin and the substrate, the skin including the external surface and the mating surface of the panel and the substrate including the internal surface of the panel.

Clause 6. The component of clause 4, any other clause, or any combination of clauses, including a mounting member, the mounting member including a mating surface in mating engagement with the mating surface of one or more of the panels, the foam core connecting the mounting member to one or more of the panels.

Clause 7. The component of clause 4, any other clause, or any combination of clauses, wherein the peripheral mating surface of each panel extends around the entire perimeter of the panel.

Clause 8. The component of clause 4, any other clause, or any combination of clauses, including a sealant member located between the mating surfaces of two or more adjacent panels that are in engagement with one another, the sealant member forming a seal therebetween for preventing foam of the foam core from passing between the engaged mating surfaces when the foam is injected into the interior cavity of the cover.

Clause 9. The component of clause 4, any other clause, or any combination of clauses, including a sealant member located between the mating surfaces of two or more adjacent panels that are in engagement with one another, the sealant member comprising an adhesive for securing the adjacent mating surfaces of the panels together.

Clause 10. The component of clause 4, any other clause, or any combination of clauses, wherein the plurality of panels includes a front panel, a rear panel, a left panel, and a right panel, the engagement surface of the front panel including an upper surface portion in engagement with an upper surface portion of the engagement surface of the rear panel, the engagement surface of the right panel in engagement with a first side surface portion of the engagement surface of the front panel and a first side surface portion of the engagement surface of the rear panel, and the engagement surface of the left panel in engagement with a second side surface portion of the engagement surface of the front panel and a second side surface portion of the engagement surface of the rear panel.

Clause 11. The component of clause 4 any other clause, or any combination of clauses, comprising a component of a vehicle seat.

Clause 12. A method of producing a component for a vehicle, the method comprising the steps of providing a mold having a plurality of walls adapted to define an interior chamber.

Clause 13. The method of clause 12, any other clause or combination of clauses, wherein each wall includes on interior securement surface having a plurality of vacuum apertures.

Clause 14. The method of clause 13, any other clause or combination of clauses, further comprising the steps of providing a vacuum system operatively coupled to the vacuum apertures of the walls of the mold.

Clause 15. The method of clause 14, any other clause or combination of clauses, further comprising the steps of placing one or more panels in engagement with the interior securement surfaces of the walls of the mold.

Clause 16. The method of clause 15, any other clause or combination of clauses, further comprising the steps of securing each panel to the interior surface of a wall of the mold with a suction force created in the vacuum apertures by the vacuum system.

Clause 17. The method of clause 16, any other clause or combination of clauses, further comprising the steps of pressing mating surfaces of adjacent panels into engagement with one another to form a cover having an interior cavity.

Clause 18. The method of clause 17, any other clause or combination of clauses, further comprising the steps of injecting foam into the interior cavity of the cover, the foam adapted to secure the panels together.

Clause 19. The method of clause 18, any other clause, or any combination of clauses, wherein the mold includes a front side wall, a rear side wall, a left side wall, a right side wall, a bottom wall, and a top wall.

Clause 20. The method of clause 18, any other clause, or any combination of clauses, including placing an adhesive on an engagement surface of a panel such that the adhesive is located between adjacent engagement surfaces of adjacent panels when the panels are pressed together.

Clause 21. A component for a vehicle produced by the method of clause 18, any other clause, or any combination of clauses.

The invention claimed is:

1. A component for a vehicle, the component comprising:
    a cover including a plurality of panels, each panel including an exterior surface, an interior surface, and a peripheral mating surface extending between the exterior surface and the interior surface, the mating surface of each panel being in mating engagement with the mating surface of one or more adjacently located panels, the plurality of panels forming an interior cavity in the cover and
    a foam core injected into the interior cavity of the cover, the injected foam core being adhered to the interior surface of each of the panels to secure the mating surface of each panel to the mating surface of one or more adjacent panels such that the mating surface of each panel is in engagement with the mating surface of one or more adjacent panels.

2. The component of claim 1, wherein each panel comprises an exterior skin, an internal substrate, and a foam layer located between the skin and the substrate, the skin including the external surface and the mating surface of the panel and the substrate including the internal surface of the panel.

3. The component of claim 1, including a mounting member, the mounting member including a mating surface in mating engagement with the mating surface of one or more of the panels, the injected foam core connecting the mounting member to one or more of the panels.

4. The component of claim 1, wherein the peripheral mating surface of each panel extends around the entire perimeter of the panel.

5. The component of claim 1, including a sealant member located between the mating surfaces of two or more adjacent panels that are in engagement with one another, the sealant member forming a seal therebetween for preventing foam of the foam core from passing between the engaged mating surfaces when the foam is injected into the interior cavity of the cover.

6. The component of claim 1, including a sealant member located between the mating surfaces of two or more adjacent panels that are in engagement with one another, the sealant member comprising an adhesive for securing the adjacent mating surfaces of the panels together.

7. The component of claim 1, wherein the plurality of panels includes a front panel, a rear panel, a left panel, and a right panel, the engagement surface of the front panel including an upper surface portion in engagement with an upper surface portion of the engagement surface of the rear panel, the engagement surface of the right panel in engagement with a first side surface portion of the engagement surface of the front panel and a first side surface portion of the engagement surface of the rear panel, and the engagement surface of the left panel in engagement with a second side surface portion of the engagement surface of the front panel and a second side surface portion of the engagement surface of the rear panel.

8. The component of claim 1 comprising a component of a vehicle seat.

* * * * *